United States Patent
Germann et al.

(10) Patent No.: US 9,952,063 B2
(45) Date of Patent: Apr. 24, 2018

(54) CONTACTLESS SENSOR FOR DETERMINING ROTOR DISPLACEMENTS

(71) Applicant: MECOS AG, Winterthur (CH)

(72) Inventors: Stephan Germann, Madetswil (CH); Philipp Buhler, Zurich (CH)

(73) Assignee: MECOS AG, Winterthur (CH)

( * ) Notice: Subject to any disclaimer, the term of this patent is extended or adjusted under 35 U.S.C. 154(b) by 95 days.

(21) Appl. No.: 15/027,276

(22) PCT Filed: Sep. 26, 2014

(86) PCT No.: PCT/EP2014/070661
§ 371 (c)(1),
(2) Date: Apr. 5, 2016

(87) PCT Pub. No.: WO2015/052016
PCT Pub. Date: Apr. 16, 2015

(65) Prior Publication Data
US 2016/0238412 A1    Aug. 18, 2016

(30) Foreign Application Priority Data
Oct. 11, 2013   (CH) .................................. 1739/2013

(51) Int. Cl.
*G01B 7/30* (2006.01)
*G01D 5/20* (2006.01)
*G01B 7/00* (2006.01)

(52) U.S. Cl.
CPC .............. *G01D 5/204* (2013.01); *G01B 7/00* (2013.01)

(58) Field of Classification Search
CPC ........ G01D 5/204; G01D 5/145; G01D 5/147; G01D 5/2457; G01D 5/2013;
(Continued)

(56) References Cited

U.S. PATENT DOCUMENTS 2,957,126 A * 10/1960 Wright, Jr. ............. G01B 7/312
                                                  324/207.15
3,046,535 A    7/1962 Philbin et al.
(Continued)

FOREIGN PATENT DOCUMENTS

GB        1 295 460 A     11/1972

OTHER PUBLICATIONS

International Search Report for PCT/EP2014/070661 dated Dec. 5, 2014.
Written Opinion for PCT/EP2014/070661 dated Dec. 5, 2014.

*Primary Examiner* — Thang Le
(74) *Attorney, Agent, or Firm* — Sughrue Mion, PLLC

(57) ABSTRACT

A contactless electromagnetic sensor device for determining displacements of a rotor (120) is disclosed. Two sensing coils (612, 614) interact with surfaces of the rotor. A bridge circuit is formed by the sensing coils and by two secondary windings (212, 213) of an input transformer (210). The primary winding of the input transformer receives an excitation signal. An output signal is obtained at an output tap formed by a common node between the sensing coils (612, 614) and a common node between the secondary windings of the input transformer. In this manner excitation and detection are separated. If cables are used for connecting the bridge circuit to signal processing circuitry, the input and output impedances of the bridge circuit can be matched to the characteristic impedance of the cables. An output transformer can be connected to the output tap. The roles of the input and output transformers can be interchanged.

22 Claims, 8 Drawing Sheets

(58) Field of Classification Search
CPC ....... G01D 5/2046; G01P 3/443; G01P 3/488;
G01P 3/487; G01P 3/481; G01P 3/685;
G01P 1/026; G01P 3/66; G01P 3/68;
G01P 3/665; G01B 7/30; G01B 7/003;
G01B 7/14
USPC ................ 324/173–174, 178–179, 161, 162,
324/207.2–207.25, 259, 546
See application file for complete search history.

(56) References Cited

U.S. PATENT DOCUMENTS

| | | | |
|---|---|---|---|
| 3,163,846 A * | 12/1964 | Kimbell | G01V 1/362 346/33 C |
| 3,491,289 A | 1/1970 | Petrini | |
| 3,619,014 A * | 11/1971 | Quick | F16C 32/0404 310/90.5 |
| 3,667,017 A * | 5/1972 | Ramirez | H02P 1/44 318/787 |
| 3,689,905 A | 9/1972 | Ariga | |
| 3,735,216 A * | 5/1973 | Uemura | H02P 25/10 307/401 |
| 3,916,274 A * | 10/1975 | Lewus | H02P 1/44 318/787 |
| 4,291,661 A * | 9/1981 | Gerry | F02P 3/005 123/606 |
| 4,437,019 A | 3/1984 | Chass | |
| 4,853,569 A * | 8/1989 | Lewus | H02K 11/02 310/68 E |
| 5,617,023 A | 4/1997 | Skalski | |
| 5,818,224 A | 10/1998 | Van Den Berg | |
| 6,664,782 B2 | 12/2003 | Slates | |
| 6,803,757 B2 | 10/2004 | Slates | |
| 2010/0066340 A1* | 3/2010 | Delforge | A61B 6/56 323/305 |
| 2010/0134074 A1* | 6/2010 | Crane | H02K 19/26 322/79 |

* cited by examiner

CONTACTLESS SENSOR FOR DETERMINING ROTOR DISPLACEMENTS

CROSS REFERENCE TO RELATED APPLICATIONS

This application is a National Stage of International Application No. PCT/EP2014/070661 filed Sep. 26, 2014, claiming priority based on Swiss Patent Application No. 01739/2013 filed Oct. 11, 2013, the contents of all of which are incorporated herein by reference in their entirety.

TECHNICAL FIELD

The present invention relates to a sensor device for measuring characteristics of a rotor, in particular, rotor displacements, and to an apparatus equipped with such a sensor device.

PRIOR ART

Contactless electromagnetic sensors, in particular, eddy-current sensors and inductive sensors (also called reluctance sensors), are often employed for monitoring displacements of rotors in machinery like pumps and compressors. Monitoring the rotor position is of particular importance if the rotor is suspended by active magnetic bearings, where position information is needed for control of the magnetic bearings.

An eddy-current sensor normally comprises a transducer connected to signal processing circuitry. A multi-lead connecting cable may be present between the transducer and the signal processing circuitry. In some embodiments, the transducer comprises a single sensing coil. The signal processing circuitry comprises a signal generator that excites a high-frequency AC current in the sensing coil, often at frequencies exceeding 100 kHz. The high-frequency current creates an alternating magnetic field around the sensing coil, which induces eddy currents in a nearby electrically conducting target on the rotor. The eddy currents in turn induce a counter electromotive force (emf) in the sensing coil, which alters the impedance of the transducer. Such impedance changes are detected by the signal processing circuitry to provide an indication of the distance between the transducer and the target. For this purpose the signal processing circuitry may comprise an analog or digital demodulator. An example of a single-coil sensor system with a digital demodulator is disclosed in U.S. Pat. No. 6,664,782. This document also discusses some general problems associated with single-coil transducers.

Inductive sensors work on a very similar principle as eddy-current sensors. However, the operating frequency of inductive sensors is generally lower than for eddy-current sensors, often in the range of a few kHz only. A target with a high magnetic permeability, e.g. a ferromagnetic or ferrimagnetic target, directly influences the self-inductance of the sensing coil. In the following, eddy-current displacement sensors and inductive displacement sensors will collectively be designated as contactless electromagnetic displacement sensors.

In some applications, the transducers of contactless electromagnetic displacement sensors may be exposed to adverse mechanical, physical and chemical conditions, such as strong vibrations, high temperatures, high pressures, high humidity or the presence of chemically aggressive substances. Considerable efforts have been made in the prior art to provide encapsulated transducers that are able to withstand such adverse conditions. An example is disclosed in U.S. Pat. No. 5,818,224. However, the range of operating conditions in which such encapsulated transducers can be used is limited, and constructive efforts for integrating fully encapsulated transducers into the machinery can be high.

Furthermore, sensors with single-coil transducers are susceptible to temperature errors due to temperature variations of the impedance not only of the transducer, but also of the connecting cable. A change in impedance due to temperature drifts or humidity changes can be mistaken for a change of impedance due to a distance change between the transducer and the target. This will result in inaccurate distance measurements. The problem is exacerbated in applications where it is necessary to connect the signal conditioning circuitry to the transducer via a rather long connecting cable, as it may be the case in large rotary machines like compressors or large pumps, where cable length can easily exceed 20 meters and can reach 300 meters or more.

Some of these problems have been addressed in the prior art by employing multi-coil transducers. For instance, U.S. Pat. No. 6,803,757 suggests employing a multi-coil transducer including a sensing coil, a drive coil and a reference coil. A signal generator drives the drive coil to induce eddy currents in a target. The sensing coil is interposed between the drive coil and the target and outputs an induced voltage that depends on the distance between the transducer and the target. The reference coil is inductively coupled to the drive coil without being influenced by the target. Signals from the reference coil are fed back to the signal generator so as to keep the magnetic field that is generated by the drive coil essentially constant. Six wires are required for connecting the transducer to the remaining circuitry.

GB 1 295 460 discloses a sensor that employs a dual-coil transducer. A sensing coil and a reference coil are axially aligned in a common electrically conducting transducer housing, the sensing coil being arranged adjacent to one end of the housing whereas the reference coil is remote from this end. The sensing coil and the reference coil are connected in series to form the first and second legs of a bridge circuit. The third and fourth legs of the bridge circuit are formed by series-connected, identical secondary windings of a first transformer. The mid points between each pair of legs are connected by the primary winding of a second transformer. The sensing coil and the reference coil are commonly excited by feeding an AC current to the primary winding of the first transformer. The impedance of the sensing coil is influenced by the presence of an electrically conducting target near the first end, whereas the impedance of the reference coil remains largely unaffected by the target. This causes the bridge circuit to be unbalanced, leading to an AC voltage across the primary winding of the second transformer. The resulting voltage at the secondary winding of the second transformer is detected by a demodulator. At least three wires are required to connect the transducer to the remaining circuitry. A sensor with a similar electric layout is also disclosed in U.S. Pat. No. 3,491,289.

U.S. Pat. No. 5,617,023 discloses various embodiments of an inductive position sensor. In some embodiments, two transducers are arranged on opposite sides of an elevator rail. Each transducer comprises a primary coil and a secondary coil on a common magnetic core. The primary coils are connected in a series configuration to a signal generator, and the secondary coils are connected in an anti-series configuration to a synchronous detector. In this way, only the difference between the voltages that are induced in the secondary coils is detected. Four wires are required to connect the two coils of each transducer to the remaining circuitry.

SUMMARY OF THE INVENTION

It is an object of the present invention to provide a contactless electromagnetic sensor device that is specifically adapted for determining displacements of a rotary shaft in a rotary machine, the sensor device having a simple wiring scheme and being suited to be used with long cables.

In a first aspect, the present invention provides a sensor device for determining characteristics of a rotor, the sensor device comprising:

- a first and a second sensing coil, each coil configured to interact with a surface of the rotor to detect displacements of the rotor relative to the first and second sensing coils; and
- an input transformer having a primary winding and at least a first and a second secondary winding, the primary winding of the input transformer forming an input for an excitation signal;
- wherein the first sensing coil, the second sensing coil and the secondary windings of the input transformer are connected to form a bridge circuit, the bridge circuit comprising a first, second, third and fourth leg, the first leg comprising the first sensing coil, the second leg comprising the second sensing coil, the first leg and the second leg being connected in series to form a common node between them, the third leg comprising the first secondary winding of the input transformer, and the fourth leg comprising the second secondary winding of the input transformer, the third and fourth leg being connected in series to form a common node between them,
- wherein the common node between the first and second legs of the bridge circuit is connected to a first contact of a first output tap for a first output signal, and
- wherein the common node between the third and fourth legs of the bridge circuit is connected to a second contact of the first output tap.

The term "output tap" is to be interpreted in the broadest sense as referring to any structure that permits an electrical connection for reading out the output signal. The output tap may, e.g., take the form of a connector, of a socket terminal, or of a pair of solder joints, which do not even have to be adjacent to one another.

By connecting the two sensing coils to the secondary windings of the input transformer in a bridge circuit, excitation and detection are separated. An excitation signal is provided to the primary winding of the input transformer, and only a difference signal is detected as an output signal at the output tap. This difference signal reflects the amount by which the rotor is displaced relative to the two sensing coils. The excitation signal may be provided from a signal generator to the primary winding of the input transformer via a cable. Likewise, the output signal may be read out from the output tap via a cable. By separating the (large) excitation voltage and the (relatively small) difference signal and transmitting these voltages separately through the cables, sensitivity to changes in cable impedance is much reduced. This makes it possible to use long cables.

An input transformer is also employed in GB 1 295 460. However, an important difference of the present invention as compared to that document is in the arrangement and the function of the coils that interact with the input transformer: Whereas in GB 1 295 460 these coils are a sensing coil and a reference coil of a single transducer, only the sensing coil being influenced by movements of the target, in the present invention both coils are sensing coils that are configured to interact with a rotor, preferably with oppositely directed surfaces of the rotor. The rotor thus forms a target for both sensing coils. The impedances (in particular, inductances) of the sensing coils are preferably influenced by movements of this target along a predetermined direction with opposite sign, i.e., if the target is displaced in the predetermined direction, the impedance of one of the sensing coils will increase while the impedance of the other sensing coil will decrease. To enable placement of the sensing coils close to the rotor, each sensing coil can, e.g., be part of a separate transducer, the transducers being suited to be individually positioned relative to the rotor. In other embodiments, the sensing coils can be arranged on a common carrier, e.g., on a common circuit board, that is shaped to enable the coils to be arranged close to the rotor. The invention is not limited to a specific manner in which the sensing coils are configured, as long as they can be placed so as to interact with the rotor, and preferably with oppositely directed surfaces thereof.

The term "interacting with oppositely directed surfaces of the rotor" is to be understood as encompassing any situation in which the sensing coils interact with surfaces whose surface normals point in opposite directions. The surfaces can be, for instance, radially opposite portions of an outer circumferential surface of a rotor shaft, for detection of radial displacements. In this case, the sensing coils are positioned on opposite radial sides of the rotor shaft. In case of a hollow rotor, the surfaces can be radially opposite portions of an inner circumferential surface of the rotor. In this case, the sensing coils are both positioned inside the hollow rotor in a radially opposing configuration. In other embodiments, the sensing coils can, e.g., be positioned on axially opposite surfaces of a thrust disk, for detection of axial displacements.

In yet other embodiments, each of the sensing coils can, e.g., be positioned on axially opposite sides of a circumferential edge on a circumferential surface of the rotor shaft, the edge separating two regions on the rotor shaft that have different magnetic susceptibilities or electric conductivities, to detect axial displacements of the rotor. In particular, two circumferential edges may be provided, the edges delimiting a ring of a target material that has a different susceptibility than the adjacent rotor material, or the edges delimiting a circumferential notch or radially protruding ring. A further sensing coil may be connected in series with each of the first and second sensing coil and may be arranged in a radially opposing configuration with the respective sensing coil, so that each of the first and second legs of the bridge circuit comprises two series-connected sensing coils arranged to interact with radially oppositely directed surfaces of the rotor. Radial displacements of the rotor will then influence the impedances of the series-connected coils in each leg with opposite sign, cancelling the influence of radial displacements on the output signal. In this manner, only axial displacements are detected.

The input transformer can be used to match the impedance of the bridge circuit, as transformed by the transformers, to the characteristic impedance (wave impedance) of the cables. This allows the use of sensing coils that are specifically adapted to a specific application, without having to match the impedance of the sensing coils themselves to the cables. For instance, sensing coils with a low number of turns and thick insulation layers can be used. In this way a more rugged transducer design becomes possible.

Further impedance matching elements, in particular, capacitors, can be connected to the input transformer for improving the impedance match. The impedance matching elements can comprise at least one capacitor connected in parallel to the primary winding or to at least one of the secondary windings of the input transformer. A single capacitor in parallel to the primary or to the series-connected secondary windings may be employed. However, it is also possible to use more complicated matching structures formed by a plurality of capacitors and/or inductances, e.g. in the form of an L-, T- or Pi-structure, as it is per se well known in the art of high-frequency electronics.

It is particularly advantageous to connect such elements to the secondary windings of the input transformer to achieve impedance matching at the primary winding. In particular, the sensor device may comprise:
- an input cable connected to the primary winding of the input transformer, the input cable having a first characteristic impedance; and
- at least one impedance matching element connected to the first and/or second secondary windings of the input transformer to match an input impedance at the primary winding of the input transformer to a characteristic impedance of the input cable.

Instead or in addition, it is possible to employ impedance matching elements that are connected to the primary winding of the input transformer.

The impedance matching elements are advantageously arranged in the vicinity of the input transformer. In particular, if the input transformer is separated from the sensing coils by a wall, e.g. by a housing wall of a machine housing, it is preferred if the impedance matching elements are arranged on the same side of the wall as the input transformer. However, if the impedance matching elements are connected at the secondary side of the input transformer, it is also possible to arrange the impedance matching elements in the vicinity of the sensing coils, in particular, on the same side of a separating wall as the sensing coils.

In addition to or instead of the input cable, transfer cables can be employed to connect the secondary windings of the input transformer (i.e., the third and fourth legs of the bridge circuit) to the sensing coils (i.e., to the first and second legs of the bridge circuit). The impedance of the components connected to the far end of the transfer cables should preferably be matched to the characteristic impedance of the transfer cables. Again, impedance matching elements such as capacitors can be used to this end. In particular, the device can comprise:
- a first transfer cable having a first end and a second end, the first end being connected to the third leg of the bridge circuit and the second end being connected to the first leg of the bridge circuit, the first transfer cable having a first characteristic impedance;
- a second transfer cable having a first end and a second end, the first end being connected to the fourth leg of the bridge circuit and the second end being connected to the second leg of the bridge circuit, the second transfer cable having a second characteristic impedance; and
- one or more impedance matching elements connected to the second ends of the first and second transfer cables to match input impedances at the first and second legs of the bridge circuit to the characteristic impedances of the first and second transfer cables.

Again, the impedance matching elements are advantageously arranged in the vicinity of the second ends of the transfer cables. In particular, if these ends are separated from the sensing coils by a wall, it is preferred if the impedance matching elements are arranged on the same side of the wall as the cable ends. However, it is also possible to arrange the impedance matching elements in the vicinity of the sensing coils, in particular, on the same side of a separating wall as the sensing coils.

While it is possible to directly transmit the output signal from the output tap to a detection circuit, it is advantageous to first transform this output signal by an output transformer. To this end, the sensor device can comprise a first output transformer, the first output transformer having a primary winding and a secondary winding, the primary winding of the first output transformer being connected to the first and second contact of the first output tap.

If an output cable is connected to the secondary winding of the output transformer, the output impedance at the secondary winding of the output transformer should again preferably match the characteristic impedance of the output cable. Impedance matching can again be improved by employing impedance matching elements, in particular, one or more capacitors. It is advantageous to achieve impedance matching by connecting the impedance matching elements to the input of the output transformer. More specifically, the sensor device can comprise:
- an output cable connected to the secondary winding of the first output transformer, the output cable having a characteristic impedance; and
- one or more impedance matching elements connected to the primary winding of the output transformer to match an output impedance at the secondary winding of the output transformer to the characteristic impedance of the output cable.

In addition or as an alternative, it is also possible to connect impedance matching elements to the secondary winding of the output transformer. The impedance matching elements preferably comprise a capacitor connected in parallel to the primary or secondary winding of the output transformer; however, other arrangements are possible, as discussed above in connection with impedance matching at the input transformer.

Again, the impedance matching elements are advantageously arranged in the vicinity of the output transformer. In particular, if the output transformer is separated from the sensing coils by a wall, it is preferred if the impedance matching elements are arranged on the same side of the wall as the output transformer. However, if the impedance matching elements are connected to the primary winding of the output transformer, it is also possible to arrange the impedance matching elements in the vicinity of the sensing coils, in particular, on the same side of a separating wall as the sensing coils.

If no output transformer is used, or if the output transformer is arranged remotely from the sensing coils, the output signal can be transmitted from the output tap to a detection circuit or to the output transformer via an output cable. To this end, the sensor device can comprise:
- an output cable having a characteristic impedance, the output cable comprising a first and a second conductor, each conductor having a first and a second end, the first end of the first conductor being connected to the first contact of the first output tap (or equivalently, to the common node between the first and second legs of the bridge circuit), and the first end of the second conductor being connected to the second contact of the first output tap (or equivalently, to the common node between to the third and fourth legs of the bridge circuit); and one or more impedance matching elements connected to the first end of the first conductor and the second end of the second conductor to match an output impedance of the bridge circuit at the first output tap to the characteristic impedance of the output cable.

Again, the impedance matching elements are advantageously arranged in the vicinity of the first end of the conductors of the cable. In particular, if the output tap is separated from the sensing coils by a wall, it is preferred if the impedance matching elements are arranged on the same side of the wall as the output tap. However, it is also possible to arrange the impedance matching elements in the vicinity of the sensing coils, in particular, on the same side of a separating wall as the sensing coils. As discussed above, the impedance matching elements can comprise one or more capacitors and/or inductances.

As described above, it is preferred to match the output impedances of some or all signal sources that are connected to cables and the input impedances of some or all loads that are connected to cables to the characteristic impedance of the respective cable. Without such impedance matching, reflections and, in consequence, transmission losses will occur at the input and/or output of the cable. Furthermore, the behavior of the entire sensor circuit will strongly depend on the cable length. Such problems are particularly experienced in single-coil sensor systems of the prior art, where impedance matching is usually not possible on the transducer end of the cable. Signals from the signal generator are thus reflected at the interface between the cable and the transducer and directly reach the detection circuit. These reflections can be accounted for by calibration; however, this kind of compensation will fail if the cable impedance changes after calibration due to a change in environmental conditions. This effect is particularly noticeable if long cables are used. The present invention separates the transmission pathways for excitation and detection and enables impedance matching for both transmission pathways, thus minimizing reflections and transmission losses. Reflections cannot be avoided completely because of cable tolerances. However, reflected signals from the signal generator are not reflected back to the detection circuit any more because of the separated transmission pathways. The cables will still cause a phase shift due to the propagation delay in the cable; however, such a phase shift does not strongly depend on environmental parameters like temperature and humidity and can be easily compensated.

In the context of the present invention, the input impedance of a load or the output impedance of a signal source is considered to be matched to the nominal characteristic impedance of a cable if the difference between the absolute values of the input/output impedance and the nominal characteristic impedance of the cable is less than 20%, more preferably less than 10%, of the nominal characteristic impedance, and if the reactive component of the input/output impedance is less than 20%, more preferably less than 10%, of the absolute value of the nominal characteristic impedance. For instance, an input or output impedance is considered to be matched to a cable having a characteristic impedance of 50 ohms if the absolute value of the input/output impedance is between 40 and 60 ohms, more preferably between 45 and 55 ohms, and if the reactive component (the imaginary part of the complex impedance) is less than 10 ohms, more preferably less than 5 ohms. Since impedance tolerances of typical cables are in the range of 10%, impedance matching to better than 10% will only be sensible if special cables with particularly low tolerances are used.

The input transformer and the output taps (and, if applicable, also the output transformer) may be spatially separated from the sensing coils by a wall, e.g., by the wall of a housing of a machine in which the sensing coils are arranged. In such a situation, the sensor device may comprise feedthroughs for feeding electrical signals through the wall. Only three such feedthroughs are needed for connecting the two sensing coils to the input transformer and the output tap: The first feedthrough connects the "free" end of the first leg of the bridge circuit (i.e., that end of the first leg that is not connected to the common node with the second leg) to the "free" end of the third leg (i.e., that end of the third leg that is not connected to the common node with the fourth leg). It should be recalled that the first leg is the leg that comprises the first sensing coil, and the third leg is the leg that comprises first secondary winding of the input transformer. The second feedthrough connects the "free" end of the second leg (i.e., that end that is not connected to the first leg) to the "free" end of the fourth leg (i.e., that end that is not connected to the third leg). It should be recalled that the second leg is the leg that comprises the second sensing coil, and the fourth leg is the leg that comprises second secondary winding of the input transformer. The third feedthrough connects the common node between the first leg and the second leg (the point to which the first and second sensing coils are connected) to the first contact of the first output tap. All remaining connections can be completed without traversing the wall. In particular, the connections of the first and second legs (with the sensing coils) to their common node can be completed on one side of the wall, and the connection of the point common to the first and second secondary windings of the input transformer to the second contact of the first output tap can be completed on the other side of the wall.

The feedthroughs can be implemented in a variety of way, as they are known in the art. For instance, the feedthroughs can be implemented as one or more multi-contact connectors that are held in an opening of the wall, each pin of each connector forming one feedthrough.

The sensor device can be extended by a second pair of sensor coils. To this end, the sensor device can comprise a third and a fourth sensing coil. The bridge circuit can have a fifth and a sixth leg connected in series to form a common node between them, the fifth leg comprising the third sensing coil, and the sixth leg comprising the fourth sensing coil. The common node between the fifth and sixth legs of the bridge circuit can then be connected to a first contact of a second output tap for a second output signal.

In this design, a second pair of sensing coils shares the input transformer with the first pair of sensing coils. In this manner, two independent sensor channels are obtained with only one single input transformer.

If the sensing coils are separated from the input transformer and the output taps by a wall, only four feedthroughs are required to connect the four sensing coils to the input transformer and to the output taps: The first feedthrough connects the point common to the first leg of the bridge circuit (comprising the first sensing coil) and the fifth leg (comprising the third sensing coil) to the "free" end of the third leg (comprising the first secondary winding of the input transformer). The second feedthrough connects the point common to the second leg (comprising the second sensing coil) and the sixth leg (comprising the fourth sensing coil) to the "free" end of the fourth leg (comprising the second secondary winding of the input transformer). The third feedthrough connects the point common to the first and second legs to the first contact of the first output tap. The fourth feedthrough connects the point common to the fifth and sixth legs to the first contact of the second output tap. All remaining connections can be completed without traversing the wall. In particular, all connections between the first, second, fifth and sixth legs (comprising the sensing coils) can be completed on one side of the wall, and the connection of the point common to the third and fourth legs (comprising the first and second secondary windings of the input transformer) to the second contact of the first and second output taps can be completed on the other side the wall. The point common to the third and fourth leg and the second contacts of the first and second output taps can even be physically the same structure.

This can be generalized to N sensor channels with 2N legs with sensing coils, where N>1. Only N+2 feedthroughs are required to connect the 2N legs comprising sensing coils on one side of the wall to the single input transformer and N output taps on the other side of the wall.

The roles of the input and output transformers can also be interchanged, the input transformer acting as an output transformer and vice versa. The present invention thus also provides a sensor device for determining characteristics of a rotor, the sensor device comprising:
  a first and a second sensing coil, each sensing coil configured to interact with a surface of the rotor to detect displacements of the rotor relative to the first and second sensing coils; and
  an input transformer having a primary winding and a secondary winding, the primary winding of the input transformer forming an input for an excitation signal; and
  a first output transformer having at least a first and a second primary winding and a secondary winding, the secondary winding forming a first tap for a first output signal;
  wherein the first sensing coil, the second sensing coil, and the primary windings of the first output transformer are connected to form a first bridge circuit,
  the first bridge circuit comprising a first, second, third and fourth leg, the first leg comprising the first sensing coil, the second leg comprising the second sensing coil, the first leg and the second leg being connected in series to form a common node between them, the third leg comprising the first primary winding (251) of the first output transformer, and the fourth leg comprising the second primary winding of the first output transformer, the third and fourth leg being connected in series to form a common node between them, and
  wherein the secondary winding of the input transformer is connected between the common node of the first and second legs of the first bridge circuit and the common node of the third and fourth legs of the first bridge circuit.

All considerations with respect to cables and impedance matching at the ends of any cables, as discussed above, also apply for this embodiment. In particular, an input cable can be connected to the primary winding of the input transformer. The input impedance at the primary winding of the input transformer then preferably matches the characteristic impedance of the input cable. At least one impedance matching element can be connected to the primary or secondary winding of the input transformer to improve the match. The device can further comprise an output cable connected to the secondary winding of the first output transformer. The output impedance at the secondary winding of the first output transformer then preferably matches the characteristic impedance of the output cable. At least one impedance matching element can be connected to the first and/or second primary winding or to the secondary winding of the first output transformer to improve the match.

If the transformers are separated from the sensing coils by a wall, again only three feedthroughs through the wall are needed to connect the two sensing coils to the two transformers: A first feedthrough connects the point common to the first and second legs of the bridge circuit (these legs comprising the sensing coils) to one end of the secondary winding of the input transformer. A second feedthrough connects the "free" end of the first leg (comprising the first sensing coil) to the "free" end of the third leg (comprising the first primary winding of the first output transformer), and a third feedthrough connects the "free" end of the second leg (comprising the second sensing coil) to the "free" end of the fourth leg (comprising the second primary winding of the first output transformer). All remaining connections can again be completed without traversing the wall. In particular, the connection between the first and second legs (in particular, between the sensing coils) can be completed on one side of the wall, while the connection between the other end of the secondary winding of the input transformer and the point common to the third and fourth legs (comprising the first and second primary windings of the first output transformer) can be completed on the other side of the wall.

If more than one sensor channel is required, the sensor device can again be extended by providing additional pairs of sensing coils and associated further output transformers. In particular, the sensor device may comprise:
  a third and a fourth sensing coil and a second output transformer having at least a first and a second primary winding,
  wherein the third sensing coil, the fourth sensing coil and the primary windings of the second output transformer are connected to form a second bridge circuit,
  the second bridge circuit comprising a first, second, third and fourth leg, the first leg comprising the third sensing coil, the second leg comprising the fourth sensing coil, the first leg and the second leg being connected in series to form a common node between them, the third leg comprising the first primary winding of the second output transformer, and the fourth leg comprising the second primary winding of the second output transformer, the third and fourth leg being connected in series to form a common node between them, and
  the common node of the first and second legs of the second bridge circuit being connected to the common node of the first and second legs of the first bridge circuit, and the common node of the third and fourth legs of the second bridge circuit being connected to the common node of the third and fourth legs of the first bridge circuit.

In this manner, again two independent sensor channels are obtained with only three instead of four transformers.

If the sensing coils are separated from the transformer arrangement by a wall, five feedthroughs are required to connect the four sensing coils to the three transformers: A first feedthrough connects the common node of the first and second legs of the first bridge circuit and the common node of the first and second legs of the second bridge circuit to one end of the secondary winding of the input transformer. The second feedthrough connects the "free end" of the first leg of the first bridge circuit to the "free end" of the third leg of the first bridge circuit. The third feedthrough connects the "free end" of the second leg of the first bridge circuit to the "free end" of the fourth leg of the first bridge circuit. The fourth feedthrough connects the "free end" of the first leg of the second bridge circuit to the "free end" of the third leg of the second bridge circuit; and the fifth feedthrough connects the "free end" of the second leg of the second bridge circuit to the "free end" of the fourth leg of the second bridge circuit. All remaining connections can again be completed without traversing the wall.

This can again be generalized to N sensor channels with 2N legs with sensing coils. Only 2N+1 feedthroughs are required to connect the 2N legs comprising sensing coils on one side of the wall to the single input transformer and N output transformers on the other side of the wall.

In all these embodiments, the device may further comprise a signal processing circuit including:
- a signal generator operably connected to the primary winding of the input transformer for exciting an AC current in the primary winding of the input transformer; and
- a first detection circuit operably connected to the first output tap (possibly via the corresponding output transformer), the first detection circuit being configured to process the first output signal received from the first output tap to obtain a processed output signal that is indicative of a displacement of the rotor relative to the first and second sensing coils.

If the sensor device comprises third and fourth sensor coils, as discussed above, the signal processing circuit will further comprise a second detection circuit operably connected to the second output tap for obtaining a second output signal.

Each of the first and second detection circuits can comprise a demodulator receiving, as its input signals, the output of the respective output transformer and a carrier signal from the signal generator. Each of the first and second detection circuits can comprise a phase shifter for shifting the phase of the carrier signal relative to the phase of the output of the respective output transformer. The demodulator can comprise a mixer (i.e., a multiplier) followed by a low-pass filter. The demodulator can be implemented in digital electronics. To this end, the demodulator can comprise A/D converters for converting the output of each output transformer into a binary signal. Similarly, the signal generator can comprise a digital oscillator to create a binary frequency signal, and a D/A converter to convert the binary frequency signal into an analog excitation signal for the input transformer.

The signal processing circuit can be arranged remote from the transformers, and at least one cable can extend between (i) the signal processing circuit and (ii) the output taps and transformers. Separate cables (e.g., coaxial cables or twisted-pair cables) or a single cable with separate wire pairs (e.g., two coaxial or twisted pairs in a single sheath, shielded from each other by suitable shielding means) may be used. The sensor device may comprise one or more connectors or other structure for removably connecting one or more cables, the connectors being electrically connected to the primary winding of the input transformer and to the output taps or the secondary windings of each output transformer. The transformers may be housed in a connection box that is provided with these connecting structures.

As already mentioned, the transforming ratio of the input and output transformers can be chosen in such a manner that the input impedance of the input transformer and/or the output impedance of the output transformer matches the characteristic impedance of the cables. Likewise, the input and output impedances of the signal processing circuit can be matches to the corresponding cable impedances. In this manner reflections and losses at the interface between the bridge circuit(s) and the cables and at the interface between the signal processing circuit and the cables can be minimized. Further impedance matching elements can be employed, e.g., capacitors may be provided in parallel to the transformer windings.

In order to compensate for cable losses between the signal generator and the primary winding of the input transformer, the input transformer can comprise an auxiliary secondary winding for measuring the flux amplitude in the core of the input transformer. The signal processing circuit can then comprise an auxiliary detection circuit operably connected to the auxiliary winding for obtaining a reference signal that is indicative of the flux amplitude and therefore of the amplitude of the AC current in the primary winding. The signal processing circuit may further comprise a divider for dividing an output of the first and/or second detection circuits by the reference signal. In other embodiments, the reference signal may be used to control the output of the signal generator in such a manner that the AC current in the primary winding of the input transformer has a preset amplitude. The auxiliary measurement of the input transformer signal can also be used to measure the phase shift due to the propagation delay in the cable. This measurement can be used to adjust the phase of the signal demodulation. If a cable is employed between the auxiliary second winding of the input transformer and the signal processing circuit, the auxiliary secondary winding can be connected to the cable via a resistor connected in series to the auxiliary secondary winding or via another impedance-matching element, so as to match the characteristic impedance of the cable.

The invention further provides an apparatus comprising a housing and a rotor suspended in the housing for rotation about a rotation axis, the apparatus comprising a sensor device as disclosed above. Preferably the legs of the bridge circuit(s) that comprise the sensing coils are arranged inside the housing, whereas the transformers and output taps are arranged outside the housing. Feedthroughs through a housing wall are provided for connecting the legs comprising sensing coils inside the housing with the transformers and output taps outside the housing.

The transformers can be housed in a connection box, and the connection box can be directly mounted on the housing of the apparatus.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

DESCRIPTION OF PREFERRED EMBODIMENTS

Figure 1:
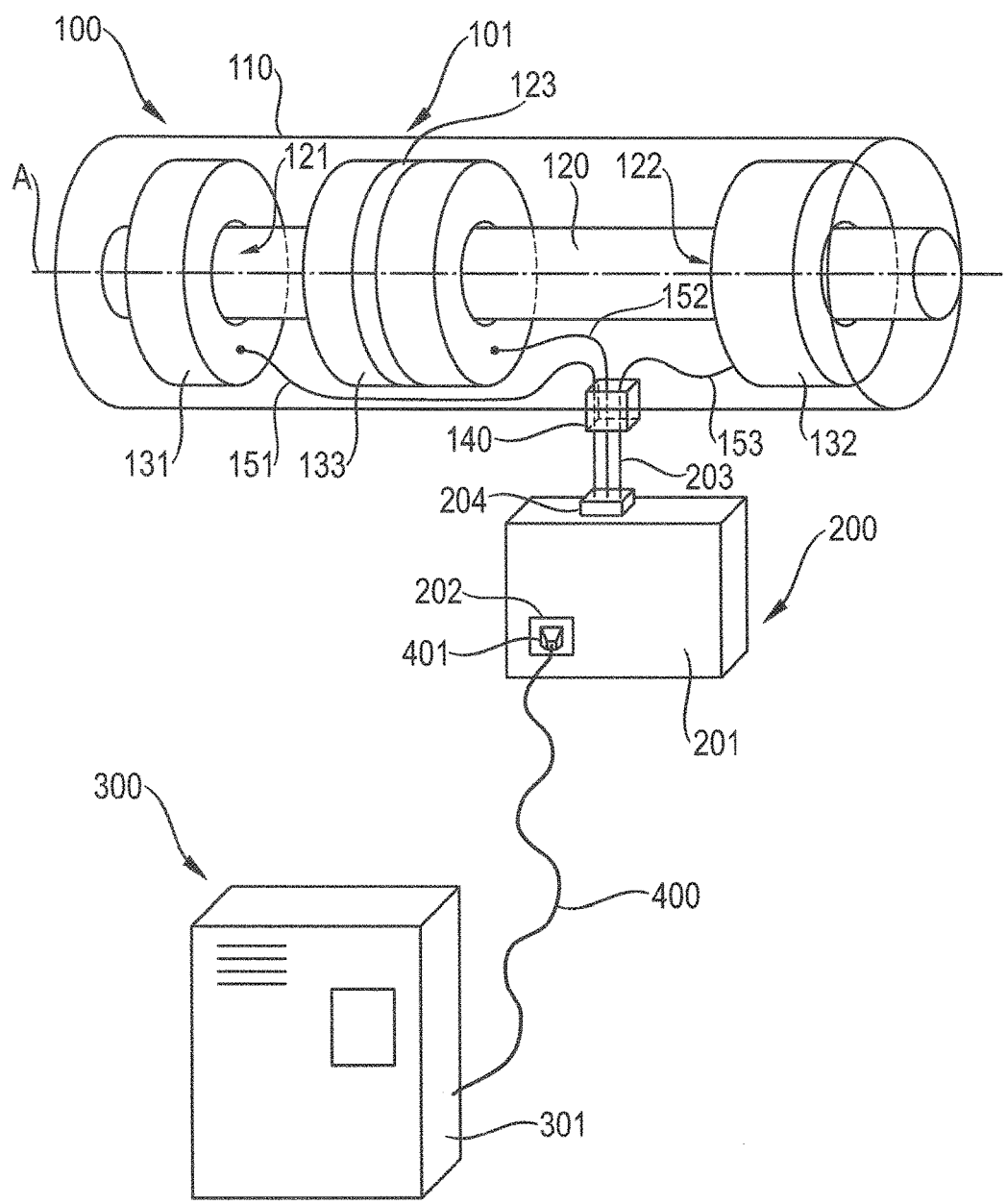
FIG. 1 shows, in a highly schematic representation, a rotary machine employing a magnetic bearing device.

FIG. 1 schematically illustrates the setup of a rotary machine 100 that employs a magnetic bearing device. The rotary machine can be, for instance, a vacuum pump, a compressor, an electric generator etc. The rotary machine comprises a housing 101 having a wall 110. A rotor 120 is suspended in the housing 101 for rotation about a rotation axis A. To this end, two active radial magnetic bearings 131, 132 are provided around rotor shaft portions 121, 122, and an active axial magnetic bearing 133 is provided on both sides of a thrust disk 123. Such magnetic bearings are known in the art and are not illustrated in any detail in FIG. 1. For controlling the active magnetic bearings 131, 132, 133, the radial positions of shaft portions 121, 122 and the axial position of thrust disk 123 and must be monitored. To this end, transducers for radial and axial displacement sensors are provided in the vicinity of shaft portions 121, 122 and thrust disk 123. These transducers are not shown in FIG. 1 and will be described in more detail below.

A connector 140 is provided in wall 110 of housing 101, traversing wall 110 and forming multiple feedthroughs for electric signals between the inside and the outside of the housing 101. Inside the housing 101, multi-lead cables 151, 152 and 153 lead from the transducers to connector 140. Instead of a single connector forming multiple feedthroughs, any other type of feedthrough can be employed, and the feedthroughs can be spaced from one another by considerable distances. In particular, separate groups of feedthroughs can be present for the transducers associated with each active magnetic bearing. Instead of a plug-type connector, any other type of connection structure can be used, e.g., terminals for receiving cable ends by a clamping or screw connection.

Outside the housing 101 of rotary machine 100, a connection box 201, forming the housing of a transformer arrangement 200 to be described in more detail below, and a cabinet 301, forming the housing of a signal processing circuit 300, also to be described in more detail below, are provided. Multi-lead cables 203 lead from the connector 140 to a connector 204 on connection box 201. These cables are relatively short. A further connector 202 is provided on connection box 201 for connecting a plug 401 of a multi-lead cable 400 or the plugs of a plurality of individual cables that lead from connection box 201 to cabinet 301. Cabinet 301 can be located several meters (e.g. up to 300 m) away from housing 101 and connection box 201, and the cable(s) 400 will therefore generally be much longer than the cables 151-153 and 203.

Figure 2:
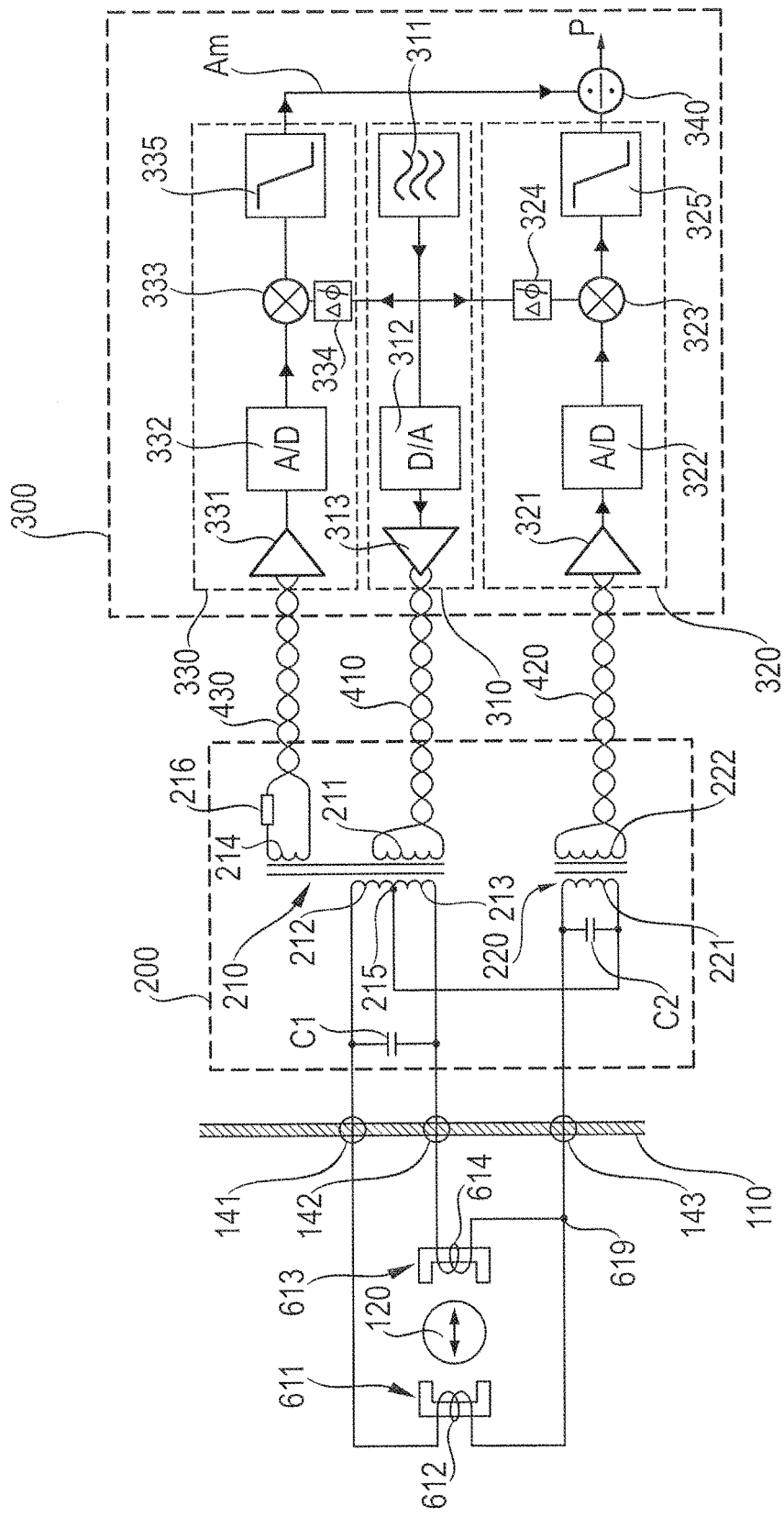
FIG. 2 shows a wiring diagram for a sensor device according to a first embodiment.

FIG. 2 illustrates, in the form of a schematic wiring diagram, a first embodiment of a radial displacement sensor of the rotary machine 100. The sensor of FIG. 2 has one single channel, i.e., it is configured to detect displacements of the rotor 120 along one single direction.

Two identical transducers 611, 613 are positioned inside the machine housing 101, on opposite sides of the rotor shaft 120, to interact with radially opposing portions of the circumferential surface of rotor shaft 120. Each transducer comprises a U-shaped core, on which a sensing coil 612, 614 is wound. The transducers are preferably not encapsulated, i.e., the sensing coils are directly exposed to the environmental conditions inside the machine housing, such as like temperature, pressure and humidity.

In the connection box 201, separated from the transducers by housing wall 110, a transformer arrangement 200 comprising an input transformer 210 and an output transformer 220 is provided. The input transformer 210 has a primary winding 211, two identical secondary windings 212 and 213 connected in series at a common node 215 (in other words, a center-tapped secondary), and an auxiliary winding 214. The output transformer 220 has a primary winding 221 and a secondary winding 222.

The transformer arrangement 200 is connected to a signal processing circuit 300 via cables 410, 420, 430. The cables can be any kind of cable that is suitable for carrying high-frequency AC currents, e.g., a "twisted pair" cable or a coaxial cable. The signal processing circuit 300 comprises a signal generator 310, a first detection circuit 320, an auxiliary detection circuit 330, and a divider 340.

The signal generator 310 comprises a digital oscillator 311, which generates a binary carrier signal. This carrier signal is fed to a digital-to-analog converter (D/A) 312, followed by an output amplifier 313. Cable 410 leads from the output of output amplifier 313 to primary winding 211 of input amplifier 210 to provide the amplified carrier signal as an AC excitation signal to primary winding 211 of input transformer 210. The output impedance of the output amplifier 313 matches the characteristic impedance (wave impedance) of the cable 410, e.g., 50 ohms. For an eddy-current sensor, the frequency of the carrier signal is preferably in the range 100 kHz-10 MHz. For an inductive sensor, the frequency is preferably 1 kHz-100 kHz. Eddy-current effects and inductive effects can both contribute to the sensor signal.

The first detection circuit 320 comprises an input amplifier 321 whose input is connected to secondary winding 222 of output transformer 220 via a cable 420. The input impedance of input amplifier 321 matches the characteristic impedance of cable 420. The input amplifier 321 is followed by an analog-to digital converter (A/D converter) 322. The binary output of the A/D converter 322 is fed to a digital multiplier 323, which receives, at its other input, the binary carrier signal from the oscillator 311, phase-shifted by a digital phase shifter 324. The binary product signal is passed through a digital low-pass filter 325.

The auxiliary detection circuit 330 is set up in a very similar manner as the first detection circuit 320. It comprises an input amplifier 331 connected to auxiliary winding 214 of input transformer 210 via a cable 430. The input impedance of input amplifier 331 matches the characteristic impedance of cable 430. For matching the (preferably very low) source impedance of the auxiliary winding to the characteristic impedance of cable 430, an ohmic resistor 216 can be provided in series with auxiliary winding 214. In addition or alternatively, other impedance matching elements such as capacitors can be employed. To provide a numerical example, if 1% of the excitation power were to be used for the auxiliary detection circuit, the winding ration between primary winding 211 and auxiliary winding 214 would be about 10:1. If the characteristic impedance of the cables 410, 430 is 50 Ohms, and if the input impedance of primary winding 211 matches this characteristic impedance, the output impedance of the auxiliary winding will be only about 0.5 Ohms. In order to match this to the characteristic impedance of cable 430, a 49.5 Ohm resistor 216 may be inserted between auxiliary winding 214 and cable 430.

The input amplifier 331 is followed by an A/D converter 332, a mixer 333, which also receives the carrier signal from oscillator 311 via a phase shifter 334, and low-pass filter 335, to obtain a reference signal Am.

A divider 340 receives the output signal of the first detection 320 and divides this signal by the reference signal Am to obtain a position signal P.

The transducers 611, 613 with sensing coils 612, 614 inside the machine housing and the transformer arrangement 200 outside the machine housing are connected as follows. One end of each sensing coil 612, 614 is connected to a common node 619 (a point common to both coils) inside the housing of machine 100. The other ("free") end of first sensing coil 612 is connected to the "free" end of the first secondary winding 212 of the input transformer 210 via a feedthrough 141 leading through housing wall 110. Similarly, the "free" end of second sensing coil 614 is connected to the "free" end of the second secondary winding 213 of the input transformer 210 via a feedthrough 142. The common node 619 between the sensing coils 612, 614 is connected to one end of the primary winding 221 of the output transformer 220 via a feedthrough 143. The other end of the primary winding 221 is connected outside the machine housing to the common node 215 between secondary windings 212, 213 of input transformer 210. In this manner, a bridge circuit with four legs is formed. Two of the legs of this bridge circuit are formed by the series-connected sensing coils 612, 614, and the other two legs are formed by the series-connected secondary windings 212, 213 of input transformer 210. The centers between these legs (i.e., the common nodes 619, 215) are connected by primary winding 221 of output transformer 220.

In operation, signal generator 310 excites an AC current in primary winding 211 of input transformer 210. This causes induced voltages of identical amplitude and phase in secondary windings 212, 213. The sum of these voltages leads to a current through series-connected sensing coils 612, 614. If rotor 120 is exactly in the center between transducers 611, 613, these currents will cause voltages of identical amplitude to be induced in sensing coils 612, 613—the bridge circuit is balanced, and no current will flow through primary winding 221 of output transformer 220. If, however, rotor 120 is displaced towards one of transducers 611, 613, eddy currents or inductive effects will cause the bridge to become unbalanced. In consequence, a current will flow through primary winding 221 of output transformer 220, phase and amplitude of this current depending on direction and amount of the displacement of rotor 120. This current will cause a voltage to be induced in secondary winding 222 of output transformer 220, which voltage is demodulated by first detection circuit 320.

At the same time, a voltage is induced in auxiliary winding 214, which is proportional to the amplitude of the flux in the core of input transformer 210, or, equivalently, to the amplitude of the excitation current flowing through primary winding 211 (neglecting saturation and hysteresis effects). This voltage is demodulated by auxiliary detection circuit 330 to provide the already discussed reference signal Am. By dividing the output of the first detection circuit 320 by this reference signal, the resulting position signal P becomes largely independent of the amplitude of the excitation current, and therefore largely independent of any losses in cable 410, assuming that losses in cable 420 and 430 are identical.

The transformation ratio of the input transformer 210 is chosen in such a way that the input impedance at its primary winding 211 (i.e., the impedance of the bridge circuit as transformed by the input transformer 210) matches the characteristic impedance of cable 410. Likewise, the transformation ratio of the output transformer 220 is chosen in such a way that the output impedance at its secondary winding 222 matches the characteristic impedance of cable 420. In this manner, losses and reflections at the interface between the cables and the transformers are minimized. For more precise matching of the input and output impedance with the cable impedance and for compensating reactance effects, a capacitor C1 is provided in parallel to the secondary windings 212, 213 of input transformer 210, and a capacitor C2 is provided in parallel to the primary winding 221 of output transformer 221. In particular, these capacitors can be used to adjust the reactance at the input and output to zero. The impedance matching to the cables impedance keeps the system essentially independent of cable length. Only the demodulation phase is phase shifters 324 and 334 needs to be adjusted dependent on cable length. It is of course possible to provide further impedance matching elements, and/or to provide impedance matching elements at other locations, e.g. capacitors could be provided in parallel to the sensor coils, or in parallel to the primary winding 211 of input transformer 210 and secondary winding 222 of output transformer 220.

Figure 3:
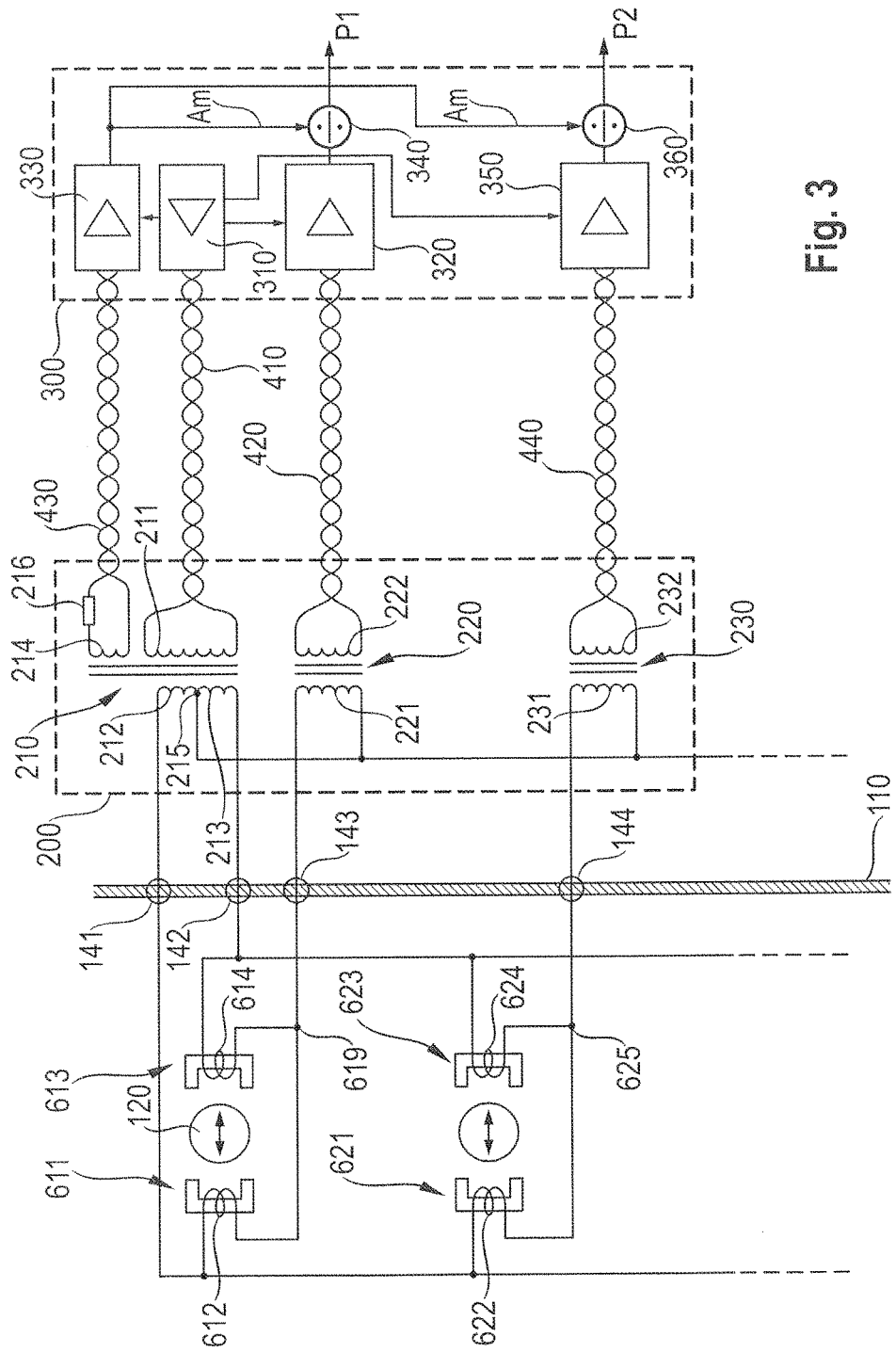
FIG. 3 shows a wiring diagram for a variant of the sensor device of FIG. 2 with additional sensor channels.

FIG. 3 illustrates how one or more further sensor channels can be added to the sensor device of FIG. 2. The part of the circuit that is shown in the upper portion of FIG. 3 fully corresponds to the circuit of FIG. 2, and elements having the same functionality as in FIG. 2 are designated by the same reference numerals. The signal generator 310, the first detecting circuit 320 and the auxiliary detecting circuit 330 are shown only as boxes. Capacitors for impedance matching may again be employed, but are not shown for simplicity.

The circuit of FIG. 3 additionally comprises a further pair of identical transducers 621, 623 with third and fourth sensing coils 622, 624 inside the machine housing, a second output transformer 230 with primary winding 231 and secondary winding 232 outside the machine housing, a second detection circuit 350, which is identical to the first detection circuit 320, and a second divider 360.

The third and fourth sensing coils 622, 624 are wired to first and second sensing coils 612, 614 and to transformers 210, 220 and 230 as follows. One end of each sensing coil 622, 624 is again connected inside the machine housing to a common node 625 between these coils. The other ("free") end of third sensing coil 622 is connected inside the machine housing to the "free" end of first sensing coil 612. Similarly, the "free" end of fourth sensing coil 624 is connected inside the machine housing to the "free" end of second sensing coil 614. The common node 625 between the third and fourth sensing coils 622, 624 is connected to one end of the primary winding 231 of the second output transformer 230 via a feedthrough 144. The other end of primary winding 231 is connected outside the machine housing to the common node 215 between secondary windings 212, 213 of input transformer 210. In this manner, two further legs, formed by the third and fourth sensing coils 622, 624, are added to the existing bridge circuit. The center between these legs is connected to the center between the secondary windings 212, 213 of input transformer 210 via the primary winding 231 of the second output transformer 230.

The mode of operation for the third and fourth sensing coils 622, 624 is the same as for the first and second sensing coils 612, 614. As a result, two independent sensor channels providing position signals P1 and P2 are obtained.

The sensor device can readily be further extended by more sensor channels in the same manner.

Figure 4:
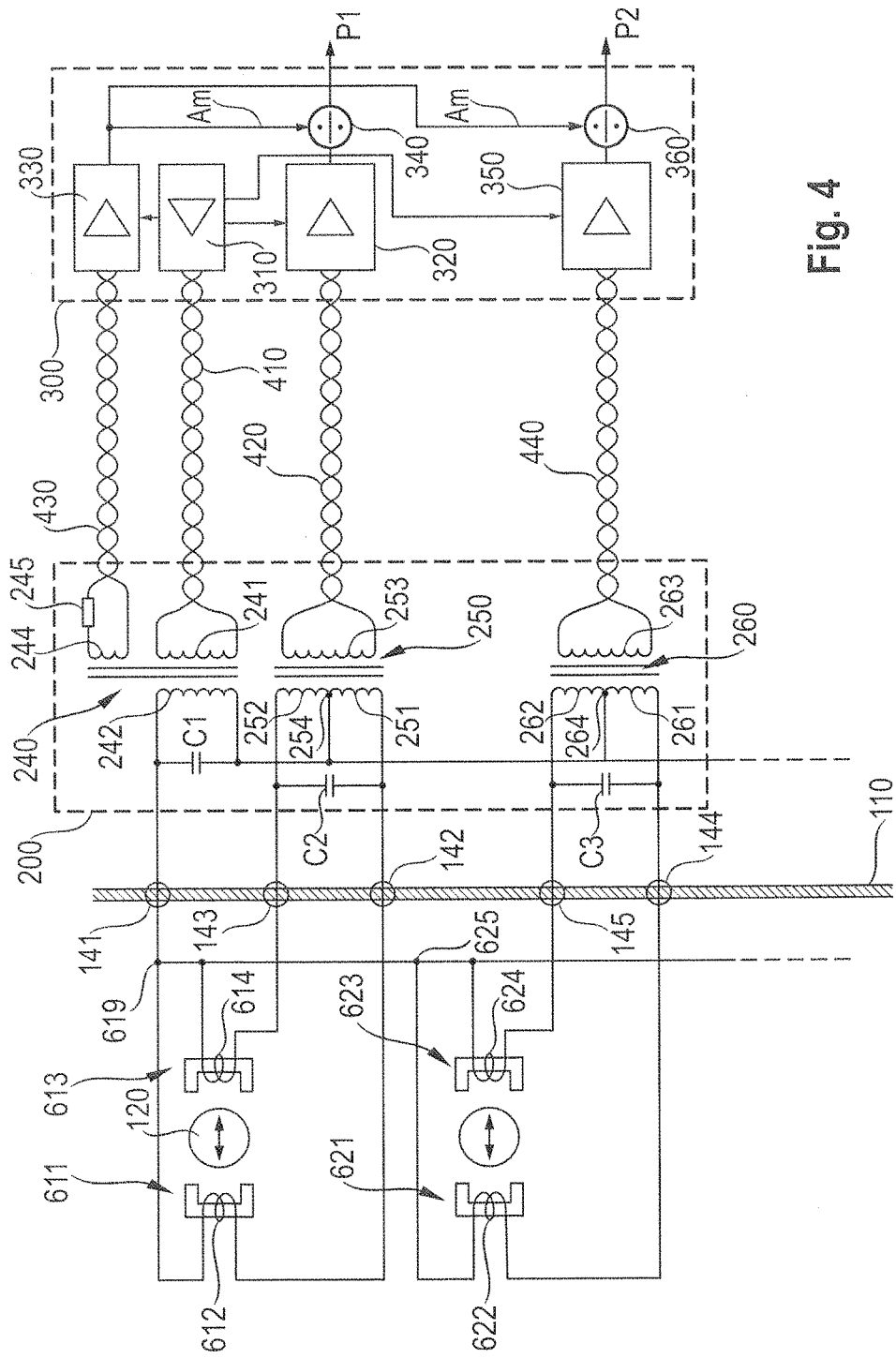
FIG. 4 shows a wiring diagram for a sensor device according to a second embodiment.

FIG. 4 illustrates a second embodiment of a radial displacement sensor, in which the roles of the input and output transformers are interchanged as compared to the embodiment of FIG. 2. Elements having the same functionality as in FIGS. 2 and 3 are designated by the same reference numerals.

Again, transducers 611, 613, 621 and 623 with sensing coils 612, 614, 622 and 624 are provided inside the machine housing. These transducers are connected to a transformer arrangement 200 outside the machine housing, comprising an input transformer 240 and output transformers 250, 260. The transformer arrangement interacts with a signal processing circuit 300 as described above via cables 410-440.

In contrast to the embodiment of FIGS. 2 and 3, input transformer 240 will have only a single secondary winding 242, while each of output transformers 250, 260 has two primary windings 251, 252 and 261, 262, respectively, connected in series at common nodes 254, 264, respectively (i.e., each output transformer has a center-tapped primary).

Sensing coils 612, 614, 622 and 624 are wired to transformers 240, 250 and 260 as follows. All four sensing coils are connected inside the machine housing to the common node 619, which is connected to one end of secondary winding 242 of input transformer 240 via a feedthrough 141 through wall 110. The common nodes 254, 264 between primary windings 251, 252, 261 and 262 of output transformers 250 and 260 are connected outside the machine housing to form a single common node. The other end of secondary winding 242 is connected outside the machine housing to this common node. Each of the remaining, "free" ends of the sensing coils 612, 614, 622 and 624 is connected to one of the remaining, "free" ends of the primary windings 251, 252, 261 and 262 of output transformers 250, 260 via feedthroughs 142, 143, 144 and 145. In this manner, two bridge circuits with four legs each are formed. The first bridge circuit comprises, as its first two legs, series-connected sensing coils 612 and 614 and, as its third and fourth legs, series-connected primary windings 251 and 252 of the first output transformer 250. The second bridge circuit comprises, as its first two legs, series-connected sensing coils 622 and 624 and, as its third and fourth legs, series-connected primary windings 261 and 262 of the second output transformer 260. These bridges share secondary winding 242 of input transformer 240, which connects the common nodes between the sensing coils and the primary windings of the output transformers.

In operation, input transformer 240 is driven by signal generator 310, causing currents to flow in both bridge circuits. Each of output transformers 250, 260 delivers a difference signal that reflects a difference between the impedances within each pair of transducers 611, 613 and 621, 623, respectively.

As in the embodiment of FIGS. 2-3, an auxiliary winding 244 is provided in series with an impedance-matching resistor 245 and is connected to an auxiliary detection circuit 330 via a cable 430.

Both in the embodiment of FIGS. 2-3 and in the embodiment of FIG. 4, all transducers are shown to measure a radial position of rotor shaft 120. In other words, both sensor channels are shown to be employed for determining radial displacements. In particular, both sensor channels can be employed to measure displacements of the same rotor portion along different directions. In another application, the two sensor channels can be employed to measure displacements of different rotor portions in the same or in different directions.

Figure 5:
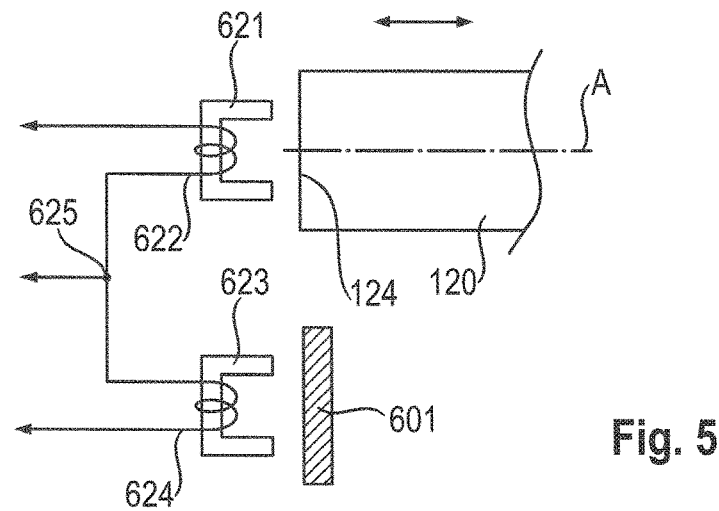
FIG. 5 illustrates an axial sensor.

However, it is also possible to employ a sensor channel for detecting axial instead of radial displacements of the rotor. An example is illustrated in FIG. 5. In this example, one of the sensing coils of the second sensor channel (here, the third sensing coil 622) is arranged proximate to an axial end face 124 of rotor 120, and the other sensing coil of that channel (here, the fourth sensor coil 624) is arranged proximate to a stationary reference target 601. Instead of placing the third sensing coil proximate to an axial end face of the rotor, it is also possible to place this coil proximate to any other rotor surface that is perpendicular to the axis of rotation A, e.g., proximate to an axial surface of a thrust disk on the rotor. It is of course also possible to position the fourth sensing coil proximate to an oppositely directed axial surface of the rotor instead of employing a reference target.

Figure 8A:
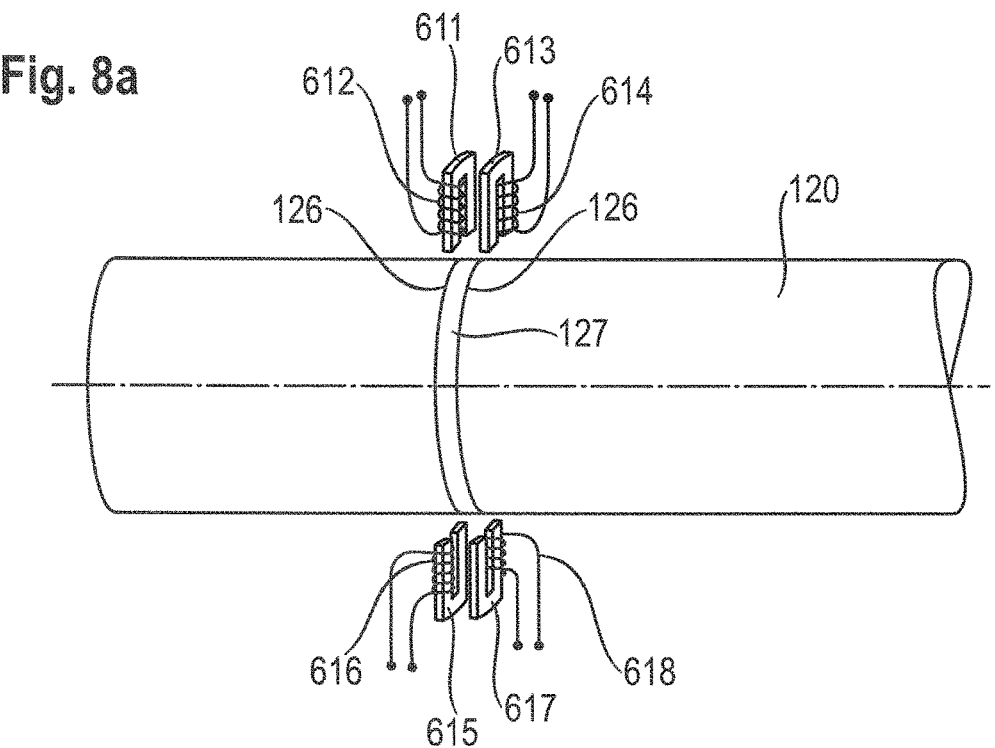
FIGS. 8a and 8b, respectively, illustrate the arrangement and circuit diagram for another embodiment of an axial sensor.
Figure 8B:
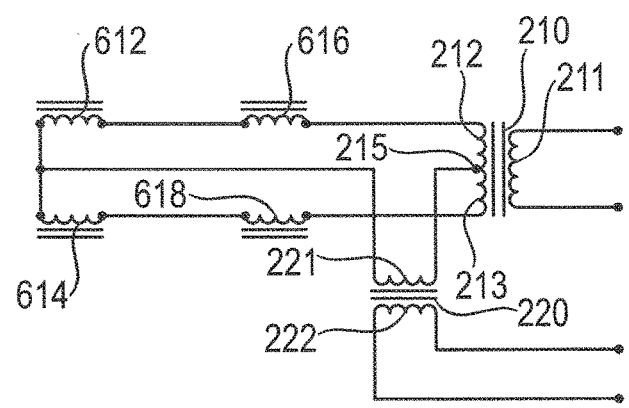

Another example how axial displacements can be determined is shown in FIG. 8a. Instead of using a surface that is perpendicular to the axis of rotation, a circumferential edge 126 on the outer circumference of rotor 120 is used. This edge 126 can be the edge of a circumferential groove, an edge between different materials (with different magnetic susceptibilities or electric conductivities), or an edge that separates any two axial regions that are different in some other respect. In the present example, two such edges 126 are present, with an annular target 127 of a different material than the rest of the rotor between them. First and second transducers 611 and 613 with first and second sensing coils 612 and 614 are arranged near edges 126. These coils can in principle be wired as in FIG. 2. However, this type of arrangement would provide undesired sensitivity to radial rotor displacements. This is compensated by adding further transducers 615, 617 with further sensing coils 616, 618, which are arranged in a radially opposing arrangement with respect to the first and second transducers. As illustrated in FIG. 8b, first sensing coil 612 is connected in series with radially opposite first further sensing coil 616, and second sensing coil 614 is connected in series with radially opposite second further sensing coil 618. In this way, the first leg of the bridge circuit comprise first sensing coil and first further sensing coil, and the second leg comprises second sensing coil and second further sensing coil. The remainder of the bridge is wired as in FIG. 2. The signal depends on axial rotor movement and is essentially independent of radial rotor movement.

Figure 6:
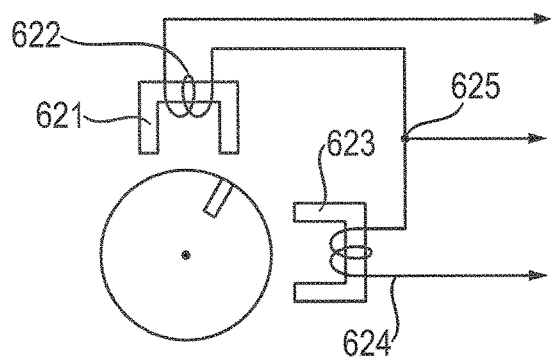
FIGS. 6 and 7 illustrate two variants of a pulse sensor.

In yet another application, a sensor channel can be employed for detecting the frequency and direction of rotation of the rotor, i.e., a sensor channel can act as a pulse sensor. An example is illustrated in FIG. 6. Here, the third and fourth sensor coils are arranged proximate the rotor at different circumferential positions spaced by less than 180° about the rotation axis A (here: spaced by 90°), and the rotor 120 is provided with a notch 125. During rotation, the impedance of sensing coils 622 and 624 changes when the notch 125 passes the respective sensing coil. From the sequence of these changes, both the frequency and direction of rotation can be determined. Instead of a notch, any other structure that renders a rotor portion proximate to the third and fourth sensor coils rotationally asymmetric can be employed.

Figure 7:
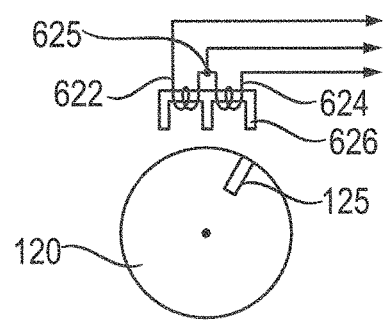

Another example for a pulse sensor of this kind is illustrated in FIG. 7. Instead of providing the sensor coils 622, 624 on separate cores, forming two separate transducers 621 and 623, both sensing coils are now placed on a common E-type core 626, forming a single pulse transducer.

Figure 9:
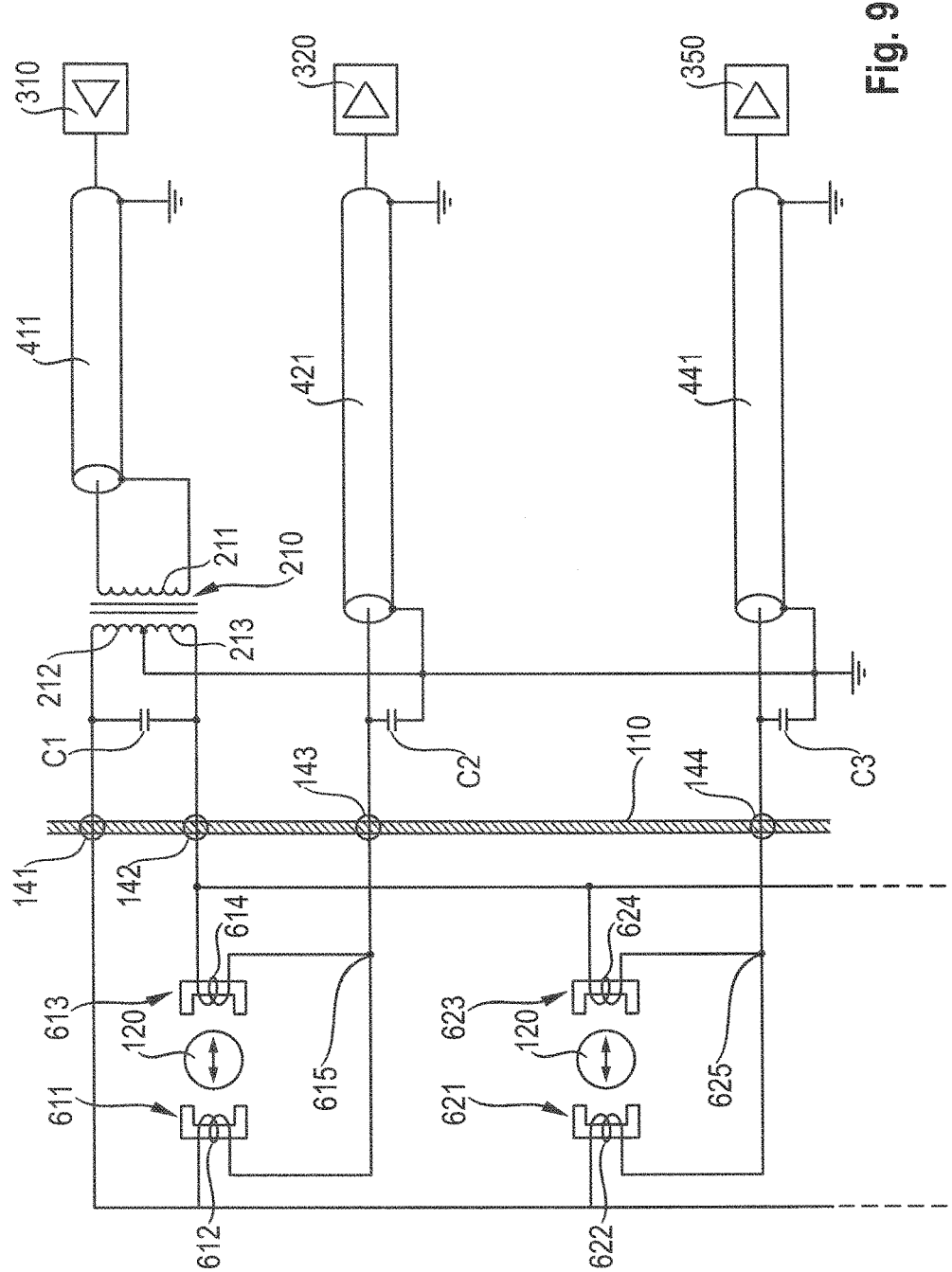
FIG. 9 illustrates a wiring diagram for a further variant of the sensor device of FIG. 2, without output transformers.

FIG. 9 illustrates that output transformers are not strictly necessary. The output signals are directly transmitted from the output taps to the detection circuits 320, 350 via coaxial cables 421, 441. A coaxial cable 411 is also used to connect input transformer 210 to signal generator 310. The center tap between the secondary windings of input transformer 210 (in more general terms, the common node between the third and fourth legs of the bridge circuit) is connected to ground, as are the outer conductors of coaxial cables 421, 441. Impedance matching at the input end of the cables 421, 441 is accomplished by an appropriate choice of the inductances of the transducers 611, 613, 621, 623 and by capacitors C2, C3 connected between the center conductor of each cable and ground. Impedance matching at the output end of the cables 421, 441 is achieved by an appropriate choice of the input impedances of detection circuits 320, 350.

Figure 10:
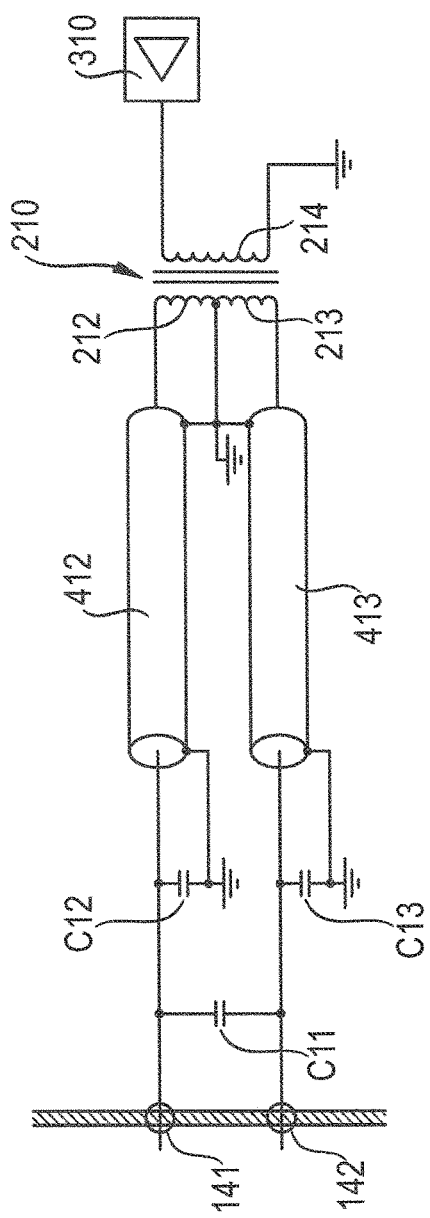
FIG. 10 illustrates a wiring diagram for a further variant of the sensor device of FIG. 2, with impedance-matched transfer cables between the input transformer and the feedthroughs through the housing wall.

FIG. 10 illustrates an embodiment in which the input transformer is spatially removed from the feedthroughs 141, 142 that lead to the transducers in the interior of the machine. Coaxial cables 412, 413 are used as transfer cables for connecting the input transformer to the feedthroughs. The outer conductors of coaxial cables 412, 413 are connected to ground at both ends. Also the center tap between the secondary windings of input transformer 210 (in more general terms, the common node between the third and fourth legs of the bridge circuit) is connected to ground. On the far end of the cables (i.e., at the end remote from the input transformer) a capacitor C11 is connected between the inner conductors of the coaxial cables, and capacitors C12, C13 are connected between each inner conductor and ground, to achieve impedance matching. At the input side of the cables, impedance matching is achieved by appropriately choosing the output impedance of signal generator 310 and the transformation ratio of input transformer 210 in such a manner that the transformed output impedance of signal generator 310 corresponds to the characteristic impedance of cables 412, 413.

Many modifications are possible without departing from the scope of the present invention. In particular, the signal processing circuit can be designed in a different manner. Analog instead of digital electronics may be employed for part or all of the functionality of the signal processing circuit. A quadrature demodulator may be used in detection circuits 320, 330 and/or 350, which would obviate the use of phase shifters 323 and/or 334. In that case the demodulator output signals are complex values. The division 340 compensates for the phase shift due to cable length because the phase shift is the same for both input signals.

Instead of dividing the output of detection circuits 320, 350 by reference signal Am, it is conceivable to feed reference signal Am to signal generator 310 so as to provide a preset current amplitude at the primary winding of the input transformer. Impedance matching can be carried out in different manners than shown, e.g., employing additional capacitors and/or additional inductors. Instead of being commonly housed in a single connection box 201, the transformers can be housed in separate housings. Instead of providing a single connector for establishing feedthroughs through housing wall 110, it is also conceivable to provide a plurality of connectors, or to establish the feedthroughs in any other known manner, e.g., by passing a cable through a (otherwise sealed) hole in wall 110. Many other modifications are possible.

The invention claimed is:

1. A sensor device for determining characteristics of a rotor, the sensor device comprising:
   first and second sensing coils, each sensing coil configured to interact with a surface of the rotor to detect displacements of the rotor relative to the first and second sensing coils; and
   an input transformer having a primary winding and at least first and second secondary windings, the primary winding of the input transformer forming an input for an excitation signal;
   wherein the first sensing coil, the second sensing coil, and the first and second secondary windings of the input transformer are connected to form a bridge circuit, the bridge circuit comprising first, second, third, and fourth legs, the first leg comprising the first sensing coil, the second leg comprising the second sensing coil, the first leg and the second leg being connected in series to form a common node between them, the third leg comprising the first secondary winding of the input transformer, and the fourth leg comprising the second secondary winding of the input transformer, the third and fourth legs being connected in series to form a common node between them,
   wherein the common node between the first and second legs of the bridge circuit forms a first output contact for a first output signal, and
   wherein the common node between the third and fourth legs of the bridge circuit forms a second output contact for the first output signal.

2. The sensor device of claim 1, further comprising:
   an input cable connected to the primary winding of the input transformer, the input cable having a first characteristic impedance; and
   at least one impedance matching element connected to at least one of the primary winding, the first secondary winding and the second secondary windings of the input transformer to match an input impedance at the primary winding of the input transformer to a characteristic impedance of the input cable.

3. The sensor device of claim 1, further comprising:
   a first transfer cable having a first end and a second end, the first end being connected to the third leg of the bridge circuit and the second end being connected to the first leg of the bridge circuit, the first transfer cable having a first characteristic impedance;
   a second transfer cable having a first end and a second end, the first end being connected to the fourth leg of the bridge circuit and the second end being connected to the second leg of the bridge circuit, the second transfer cable having a second characteristic impedance; and
   one or more impedance matching elements connected to the second ends of the first and second transfer cables to match input impedances at the first and second legs of the bridge circuit to the characteristic impedances of the first and second transfer cables.

4. The sensor device of claim 1, further comprising a first output transformer, the first output transformer having a primary winding and a secondary winding, the primary winding of the first output transformer being connected to the first and second output contacts.

5. The sensor device of claim 4, further comprising:
   an output cable connected to the secondary winding of the first output transformer, the output cable having a characteristic impedance; and
   at least one impedance matching element connected to at least one of the primary winding and the secondary winding of the output transformer to match an output impedance at the secondary winding of the output transformer to the characteristic impedance of the output cable.

6. The sensor device of claim 1, further comprising:
an output cable having a characteristic impedance, the output cable comprising a first and a second conductor, each conductor having a first and a second end, the first end of the first conductor being connected to the first output contact, and the first end of the second conductor being connected to the second output contact; and
one or more impedance matching elements connected to the first end of the first conductor and the first end of the second conductor to match an output impedance of the bridge circuit between the first and second output contacts to the characteristic impedance of the output cable.

7. The sensor device of claim 1, comprising first, second, and third feedthroughs for establishing electrical connections through a wall that separates the input transformer and a first output transformer or a first output cable from the first and second legs of the bridge circuit,
the first feedthrough connecting the first leg of the bridge circuit to the third leg of the bridge circuit;
the second feedthrough connecting the second leg of the bridge circuit to the fourth leg of the bridge circuit; and
the third feedthrough connecting the common node between the first and second legs of the bridge circuit to the first output transformer or to the first output cable.

8. The sensor device of claim 1, further comprising third and fourth sensing coils, wherein the bridge circuit has fifth and sixth legs connected in series to form a common node between them, the fifth leg comprising the third sensing coil, and the sixth leg comprising the fourth sensing coil,
wherein the common node between the fifth and sixth legs of the bridge circuit forms a third output contact for a second output signal.

9. The sensor device of claim 8, comprising first, second, third, and fourth feedthroughs for establishing electrical connections through a wall that separates the input transformer, a first output transformer or a first output cable, and a second output transformer or a second output cable from the first, second, fifth and sixth legs of the bridge circuit,
the first feedthrough connecting a point common to the first and fifth legs of the bridge circuit to the third leg of the bridge circuit;
the second feedthrough connecting a point common to the second and sixth legs of the bridge circuit to the fourth leg of the bridge circuit;
the third feedthrough connecting the common node between the first and second legs of the bridge circuit to the first output transformer or to the first output cable; and
the fourth feedthrough connecting the common node of the fifth and sixth legs of the bridge circuit to the second output transformer or to the second output cable.

10. A sensor device for determining characteristics of a rotor, the sensor device comprising:
first and second sensing coils, each sensing coil configured to interact with a surface of the rotor to detect displacements of the rotor relative to the first and second sensing coils; and
an input transformer having a primary winding and a secondary winding, the primary winding of the input transformer forming an input for an excitation signal; and a first output transformer having at least first and second primary windings and a secondary winding, the secondary winding forming a first output for a first output signal;
wherein the first sensing coil, the second sensing coil, and the first and second primary windings of the first output transformer are connected to form a first bridge circuit,
the first bridge circuit comprising first, second, third and fourth legs, the first leg comprising the first sensing coil, the second leg comprising the second sensing coil, the first leg and the second leg being connected in series to form a common node between them, the third leg comprising the first primary winding of the first output transformer, and the fourth leg comprising the second primary winding of the first output transformer, the third and fourth legs being connected in series to form a common node between them, and
wherein the secondary winding of the input transformer is connected between the common node of the first and second legs of the first bridge circuit and the common node of the third and fourth legs of the first bridge circuit.

11. The sensor device of claim 10, further comprising:
an input cable connected to the primary winding of the input transformer, the input cable having a first characteristic impedance; and
at least one impedance matching element connected to at least one of the primary winding and the secondary winding of the input transformer to match an input impedance at the primary winding of the input transformer to a characteristic impedance of the input cable.

12. The sensor device of claim 10, further comprising:
an output cable connected to the secondary winding of the first output transformer, the output cable having a characteristic impedance; and
at least one impedance matching element connected to at least one of the first primary winding, the second primary winding and the secondary winding of the first output transformer to match an output impedance at the secondary winding of the first output transformer to the characteristic impedance of the output cable.

13. The sensor device of claim 10, further comprising first, second, and third feedthroughs for establishing electrical connections through a wall that separates the input transformer and the first output transformer from the first and second legs of the first bridge circuit,
the first feedthrough connecting the common node of the first and second legs of the first bridge circuit to one end of the secondary winding of the input transformer,
the second feedthrough connecting the first leg of the first bridge circuit to the third leg of the first bridge circuit; and
the third feedthrough connecting the second leg of the first bridge circuit to the fourth leg of the first bridge circuit.

14. The sensor device of claim 10, further comprising:
third and fourth sensing coils and a second output transformer having at least first and second primary windings,
wherein the third sensing coil, the fourth sensing coil, and the first and second primary windings of the second output transformer are connected to form a second bridge circuit,
the second bridge circuit comprising first, second, third and fourth legs, the first leg comprising the third sensing coil, the second leg comprising the fourth sensing coil, the first leg and the second leg being connected in series to form a common node between them, the third leg comprising the first primary winding of the second output transformer, and the fourth leg comprising the second primary winding of the second output transformer, the third and fourth legs being connected in series to form a common node between them, and the common node of the first and second legs of the second bridge circuit being connected to the common node of the first and second legs of the first bridge circuit, and the common node of the third and fourth legs of the second bridge circuit being connected to the common node of the third and fourth legs of the first bridge circuit.

15. The sensor device of claim 14, further comprising first, second, third, fourth, and fifth feedthroughs for establishing electrical connections through a wall that separates the transformer arrangement from the first, second, third, and fourth sensing coils, the first feedthrough connecting the common node of the first and second legs of the first bridge circuit and the common node of the first and second legs of the second bridge circuit to one end of the secondary winding of the input transformer, the second feedthrough connecting the first leg of the first bridge circuit to the third leg of the first bridge circuit; and the third feedthrough connecting the second leg of the first bridge circuit to the fourth leg of the first bridge circuit;

the fourth feedthrough connecting the first leg of the second bridge circuit to the third leg of the second bridge circuit; and the fifth feedthrough connecting the second leg of the second bridge circuit to the fourth leg of the second bridge circuit.

16. The sensor device of claim 1, further comprising a signal processing circuit comprising:

a signal generator operably connected to the primary winding of the input transformer for exciting an AC current in the primary winding of the input transformer; and a first detection circuit operably connected to the first and second output contacts, the first detection circuit being configured to process the first output signal received from the first and second output contacts to obtain a processed output signal that is indicative of a position of the rotor relative to the first and second sensing coils.

17. The sensor device of claim 16, wherein the input transformer comprises an auxiliary winding, and wherein the signal processing circuit comprises an auxiliary detection circuit operably connected to the auxiliary winding for obtaining a reference signal indicative of the amplitude of the AC current in the primary winding of the input transformer.

18. The sensor device of claim 17, wherein the signal processing circuit comprises a divider for dividing an output of the first detection circuit by the reference signal.

19. The sensor device of claim 16, wherein the signal processing circuit is arranged remote from the input transformer, and wherein at least one cable extends between (i) the signal processing circuit and (ii) the input transformer and the first and second output contacts.

20. The sensor device of claim 19, further comprising a connection box, the connection box housing at least the input transformer, the connection box having at least one connection structure for removably connecting the cable to the connection box.

21. The sensor device of claim 19, wherein all input and output impedances connected to the cable match a characteristic impedance of the cable.

22. An apparatus comprising:

a housing;

a rotor suspended in the housing for rotation about a rotation axis and a sensor device, the sensor device comprising:

first and second sensing coils, each sensing coil configured to interact with a surface of the rotor to detect displacements of the rotor relative to the first and second sensing coils; and an input transformer having a primary winding and at least first and second secondary windings, the primary winding of the input transformer forming an input for an excitation signal;

wherein the first sensing coil, the second sensing coil, and the first and second secondary windings of the input transformer are connected to form a bridge circuit, the bridge circuit comprising first, second, third, and fourth legs, the first leg comprising the first sensing coil, the second leg comprising the second sensing coil, the first leg and the second leg being connected in series to form a common node between them, the third leg comprising the first secondary winding of the input transformer, and the fourth leg comprising the second secondary winding of the input transformer, the third and fourth legs being connected in series to form a common node between them, wherein the common node between the first and second legs of the bridge circuit forms a first output contact for a first output signal, wherein the common node between the third and fourth legs of the bridge circuit forms a second output contact for the first output signal, wherein at least the first and second legs of the first bridge circuit are arranged inside the housing, wherein at least the input transformer is arranged outside the housing, and wherein the housing has a housing wall with feedthroughs for connecting the first and second legs of the first bridge circuit inside the housing to the input transformer outside the housing, and for feeding an output signal from the first output contact inside the housing to a first output transformer or to a first output cable outside the housing.

\* \* \* \* \*